United States Patent
Wang et al.

(10) Patent No.: US 11,518,711 B2
(45) Date of Patent: Dec. 6, 2022

(54) METHOD FOR PRODUCING DUST-REDUCING AND DUST-ABSORBING MATERIAL FROM NONMETALLIC MINERAL AND RAW MATERIAL FROM CEMENT PLANT

(71) Applicant: Shandong University of Science and Technology, Shandong (CN)

(72) Inventors: Li Wang, Qingdao (CN); Dengzheng Gao, Qingdao (CN); Lihua Liu, Qingdao (CN); Qingbin Guo, Qingdao (CN); Zhen Xue, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 157 days.

(21) Appl. No.: 17/188,087

(22) Filed: Mar. 1, 2021

(65) Prior Publication Data
US 2021/0371334 A1    Dec. 2, 2021

(30) Foreign Application Priority Data
Jun. 2, 2020 (CN) .......................... 202010491366.9

(51) Int. Cl.
C04B 7/43    (2006.01)
C04B 2/10    (2006.01)
C04B 103/00    (2006.01)

(52) U.S. Cl.
CPC ...... C04B 2/104 (2013.01); *C04B 2103/0075* (2013.01)

(58) Field of Classification Search
CPC ......... C04B 2/104; C04B 18/162; C04B 7/43; C04B 7/436; C04B 7/522; F26B 11/028; F26B 25/007
See application file for complete search history.

(56) References Cited

U.S. PATENT DOCUMENTS 6,491,751 B1 * 12/2002 Watson .................. C04B 7/421
                                                    106/767
11,104,610 B2 * 8/2021 Lake ...................... C04B 20/04

FOREIGN PATENT DOCUMENTS

CN         214937065 U   * 11/2021

* cited by examiner

*Primary Examiner* — Gregory A Wilson
(74) *Attorney, Agent, or Firm* — Bochner IP, PLLC; Andrew D. Bochner

(57) ABSTRACT

A method for producing a dust-reducing and dust-absorbing material from a nonmetallic mineral and a raw material from a cement plant. The method includes calcining the limestone block, to obtain quicklime; cooling the quicklime at ambient temperature, drying and pulverizing the quicklime, to obtain a first powder essentially consisting of a quicklime powder and a calcium carbonate powder; fully drying and grinding a nonmetallic mineral, to obtain a nonmetallic mineral powder; mixing the first powder and the nonmetallic mineral powder, stirring to be uniform, to obtain a mixture, and ball milling the mixture, to obtain a nano-powder; adding a dust-absorbing material to the nano-powder, adding water and mixing, and pouring the resulting mixture into a mold, and stoving; and air drying the resulting mixture, to obtain a cavernous dust-reducing and dust-absorbing material.

10 Claims, 4 Drawing Sheets

METHOD FOR PRODUCING DUST-REDUCING AND DUST-ABSORBING MATERIAL FROM NONMETALLIC MINERAL AND RAW MATERIAL FROM CEMENT PLANT

CROSS REFERENCE TO RELATED APPLICATION

The application claims priority to Chinese Application No. 202010491366.9, filed on Jun. 2, 2020, entitled "Method for producing dust-reducing and dust-absorbing material from nonmetallic mineral and raw material from cement plant", which is hereby incorporated by reference in its entirety.

TECHNICAL FIELD

The present disclosure relates to a technical field of material preparation, and in particular to a method for producing a dust-reducing and dust-absorbing material from a nonmetallic mineral and a raw material from a cement plant.

BACKGROUND

At present, cement production in the cement production workshop generates a large amount of dust, including raw material dust, dust generated during the production process, and product dust. The dust is permeated in the production workshop and enters the respiratory tract with the breathing of the production workers, adversely affecting human health. In order to reduce the diffusion of dust, the cement production workshop is equipped with a dust treatment device, but the device is high in the purchase cost, and difficult to achieve a large-scale promotion; while the ordinary dust-removing and dust-reducing material has a poor adsorption effect on the dust in the cement workshop, and dust reduction effects could not be realized in the production workshop.

In view of the above analysis, the existing problems and defects of the prior art lie in that: the high purchase cost causes the dust treatment device difficult to promote; ordinary dust-removing and dust-reducing materials with poor adsorption effects on the dust in the cement workshop, could not achieve dust reduction effects.

SUMMARY

To address the problems existing in the prior art, the present disclosure provides a method for producing a dust-reducing and dust-absorbing material from a nonmetallic mineral and a raw material from a cement plant.

To realize the above objectives, the present disclosure provides a method for producing a dust-reducing and dust-absorbing material from a nonmetallic mineral and a raw material from a cement plant, comprising, step 1, choosing from raw material from a cement plant a limestone block with a moderate volume, and calcining the limestone block, to obtain quicklime;
wherein calcining the limestone block comprises steps:
(1) placing the limestone block in a calcining kiln for calcining;
(2) after decomposing the limestone and swelling a lime grain, stopping heating, and thermally insulating for 1 hour;
(3) cooling the lime grain slowly, extracting carbon dioxide generated during the calcining of the limestone block, and transferring carbon dioxide to a container;
(4) under the condition that the pressure in the calcining kiln is less than 1.6 MPa, stopping extracting carbon dioxide, and opening the calcining kiln for a ventilation, to obtain quicklime; and
(5) stirring and cooling quicklime;
step 2: cooling quicklime at ambient temperature, drying and pulverizing quicklime, to obtain a first powder essentially consisting of a quicklime powder and a calcium carbonate powder;
wherein drying and pulverizing quicklime comprises steps:
placing the cooled quicklime into a drying equipment for drying, introducing the dried quicklime into a pulverizer to pulverize; and sieving with a fine sieve, to obtain a fine powder and remove coarse particles;
step 3, fully drying and grinding a nonmetallic mineral, to obtain a nonmetallic mineral powder;
wherein grinding the nonmetallic mineral comprises steps:
3.1) adding an appropriate amount of a nonmetallic mineral after drying into a grinder, adding enough lubricating oil into a refueling bottle of the grinder via an oil inlet pipe to lubricate a grinding wheel of the grinder while rotating, starting the grinder and grinding the nonmetallic mineral, to obtain a preliminarily-ground nonmetallic mineral;
3.2) introducing the preliminarily-ground nonmetallic mineral into a stirring mill, rotating a stirring shaft of the stirring mill in one direction at a high speed for 10-20 minutes, causing violent collisions between the the preliminarily-ground nonmetallic minerals, thereby further crushing the preliminarily-ground nonmetallic mineral, and rotating the stirring shaft of the stirring mill in the other direction at a high speed for 10-20 minutes, thereby yet further crushing the preliminarily-ground nonmetallic mineral, to obtain a mixture A;
3.3) grinding the mixture A with the grinder again for 1-2 hours, to obtain a fully-ground nonmetallic mineral, subjecting the fully-ground nonmetallic mineral to a heat treatment in a heating furnace for 1.5-2 hours, placing the fully-ground nonmetallic mineral after the heat treatment in a refrigerator for a refrigeration, consolidating, to obtain a consolidated nonmetallic mineral, introducing the consolidated nonmetallic mineral into a high-speed vortex machine and pulverizing the consolidated nonmetallic mineral therein, and sieving the resulting nonmetallic mineral twice, to obtain a nonmetallic mineral powder;
step 4, mixing the first powder and the nonmetallic mineral powder, stirring to be uniform to obtain a mixture, and ball milling the mixture, to obtain a nano-powder;
step 5, adding a dust-absorbing material to the nano-powder, adding water and mixing, and pouring the resulting mixture into a mold, and stoving; and
step 6, taking the resulting mixture out after stoving, and air drying the resulting mixture, to obtain a cavernous dust-reducing and dust-absorbing material.

In some embodiments, in step (1), calcining the limestone block comprises calcining the limestone block at 1050° C. and ambient pressure.

In some embodiments, the nonmetallic mineral is one or more selected from the group consisting of magmatic rock, sedimentary rock, metamorphic rock, granite, limestone, quartzite, diorite, basalt, quartz sandstone, siliceous conglomerate, granite gneiss, shale, mudstone, chlorite schist, mica schist, basalt, and quartz sandstone.

In some embodiments, in step 3, fully drying the nonmetallic mineral comprises fully drying the nonmetallic mineral at 200° C. for 2 hours.

In some embodiments, a speed ratio of the grinder in step 3.1, step 3.2 and step 3.3 is 1:4:8.

In some embodiments, in step 3.3), the refrigeration is performed at a temperature of −15° C. to −5° C.

In some embodiments, in step 4, ball milling the mixture comprises steps:

1) placing a mixture of the first powder and the nonmetallic mineral powder in a ball mill, and adding a small amount of absolute ethanol dropwise thereto;

2) ball milling for 10-15 minutes to obtain a ball milled powder, with zirconium dioxide balls as a ball milling medium;

3) air drying the ball milled powder;

4) sieving the dried ball milled powder, to obtain a nano-powder with a particle size of 10-80 nm.

In some embodiments, the dust-absorbing material is a combination of two or more of silica gel, activated carbon, diatomaceous earth, activated alumina, and zeolite.

In some embodiments, in step 5, stoving the resulting mixture comprises stoving the resulting mixture at 120° C. for 10 hours; turning the resulting mixture over during the stoving.

Another objective of the present disclosure is to provide a dust-reducing and dust-absorbing material, which is produced by the method for producing a dust-reducing and dust-absorbing material from a nonmetallic mineral and a raw material from a cement plant as described above.

With the above technical solutions, the present disclosure has the following advantages and beneficial effects:
the method according to the present disclosure uses a nonmetallic mineral and a raw material from a cement plant as raw materials for preparing a dust-reducing and dust-absorbing material, said raw materials being easy to obtain and low in cost, thereby facilitating the preparation of a dust-reducing and dust-absorbing material, effectively reducing the preparation cost, and effectively saving resources because the dust-reducing and dust-absorbing material could be recycled after dust absorption; the method enables enhancement of adsorption capacity with the addition of a dust-absorbing material, and stronger adsorption to dust particles, producing a better dust-absorbing effect. The dust-reducing and dust-absorbing material prepared by the method according to the present disclosure is a porous material with a low density, a great activity, a good heat-exchange capacity, a good electrochemical activity, a good catalysis and other properties. In addition to adsorption, it can be used in heat exchange, catalysis and other fields. The method according to the present disclosure enables improvement of the efficiency of grinding and ball milling, and has a low cost and low energy consumption.

BRIEF DESCRIPTION OF THE DRAWINGS

In order to explain the technical solutions of the embodiments of the present disclosure more clearly, the following will briefly introduce the drawings needed in the embodiments of the present disclosure. Obviously, the drawings described below are only some embodiments of the present disclosure. For those of ordinary skill in the art, other drawings could be obtained from these drawings without creative labor.

DETAILED DESCRIPTION OF THE EMBODIMENTS

In order to make the objectives, technical solutions and advantages of the present disclosure clearer, the present disclosure will be further described in detail below in conjunction with embodiments. It should be understood that the specific embodiments described here are only intended to explain the present disclosure, but not to limit the scope of the present disclosure.

In view of the problems existing in the prior art, the present disclosure provides a method for producing a dust-reducing and dust-absorbing material from a nonmetallic mineral and a raw material from a cement plant. The present disclosure will be described in detail below with reference to the accompanying drawings.

Figure 1:
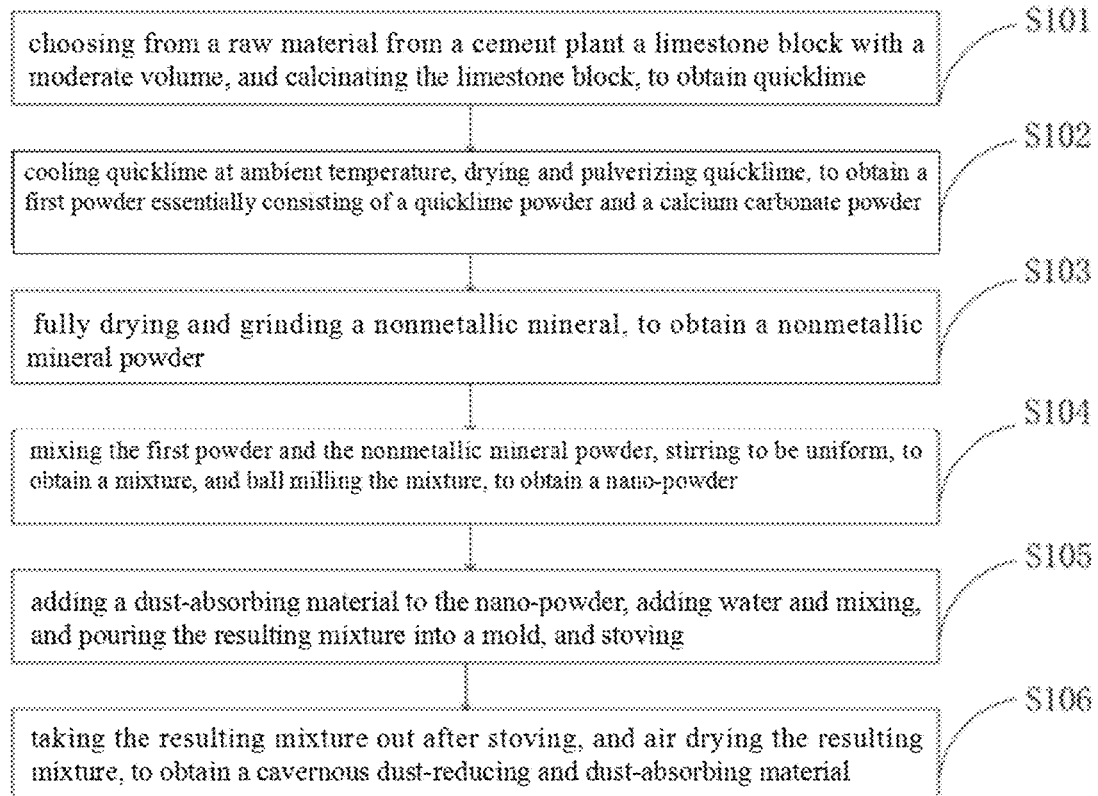
FIG. 1 shows a flowchart of a method for producing a dust-reducing and dust-absorbing material from a nonmetallic mineral and a raw material from a cement plant according to one embodiment of the present disclosure.

As shown in FIG. 1, the method for producing a dust-reducing and dust-absorbing material from a nonmetallic mineral and a raw material from a cement plant provided by some embodiments of the present disclosure comprises steps:

S101, choosing from a raw material from a cement plant a limestone block with a moderate volume, and calcining the limestone block, to obtain quicklime;

S102, cooling quicklime at ambient temperature, drying and pulverizing quicklime, to obtain a first powder essentially consisting of a quicklime powder and a calcium carbonate powder;

S103, fully drying and grinding a nonmetallic mineral, to obtain a nonmetallic mineral powder;

S104, mixing the first powder and the nonmetallic mineral powder, stirring to be uniform, to obtain a mixture, and ball milling the mixture, to obtain a nano-powder;

S105, adding a dust-absorbing material to the nano-powder, adding water and mixing, and pouring the resulting mixture into a mold, and stoving; and S106, taking the resulting mixture out after stoving, and air drying the resulting mixture, to obtain a cavernous dust-reducing and dust-absorbing material.

Figure 2:
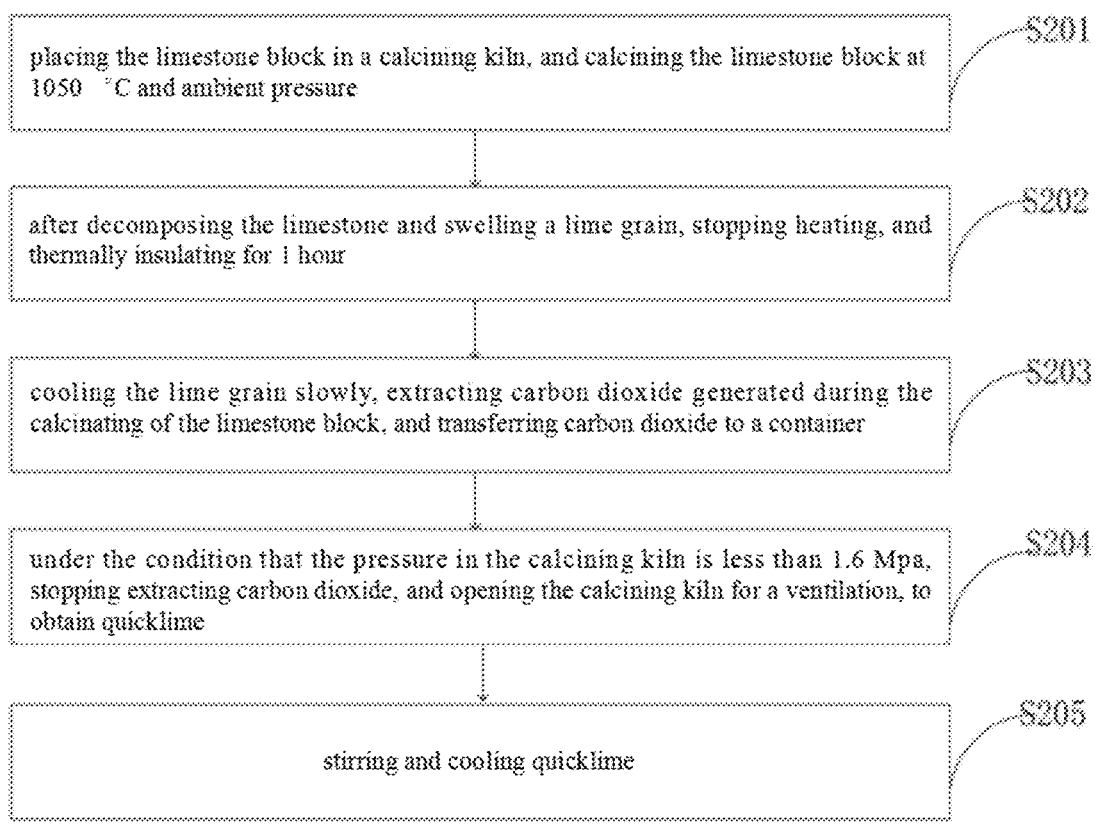
FIG. 2 shows a flowchart of a calcination according to one embodiment of the present disclosure.

As shown in FIG. 2, calcining the limestone block in some embodiments specifically comprises steps:

S201, placing the limestone block in a calcining kiln for calcining;

S202, after decomposing the limestone and swelling a lime grain, stopping heating, and thermally insulating for 1 hour;

S203, cooling the lime grain slowly, extracting carbon dioxide generated during the calcining of the limestone block, and transferring carbon dioxide to a container;

S204, under the condition that the pressure in the calcining kiln is less than 1.6 MPa, stopping extracting carbon dioxide, and opening the calcining kiln for a ventilation, to obtain quicklime; and S205, stirring and cooling quicklime.

Drying and pulverizing quicklime in some embodiments of the present disclosure comprises a step:

placing the cooled quicklime into a drying equipment for drying, introducing the dried quicklime into a pulverizer to pulverize; and sieving with a fine sieve, to obtain a fine powder and remove coarse particles.

Grinding the nonmetallic mineral in some embodiments of the present disclosure comprises steps:

3.1) adding an appropriate amount of a nonmetallic mineral after drying into a grinder, adding enough lubricating oil into a refueling bottle of the grinder via an oil inlet pipe to lubricate a grinding wheel of the grinder while rotating, starting the grinder and grinding the nonmetallic mineral, to obtain a preliminarily-ground nonmetallic mineral;

3.2) introducing the preliminarily-ground nonmetallic mineral into a stirring mill, rotating a stirring shaft of the stirring mill in one direction at a high speed for 10-20 minutes, causing violent collisions between the preliminarily-ground nonmetallic minerals, thereby further crushing the preliminarily-ground nonmetallic mineral, and rotating the stirring shaft of the stirring mill in the other direction at a high speed for 10-20 minutes, thereby yet further crushing the preliminarily-ground nonmetallic mineral, to obtain a mixture A; and 3.3) grinding the mixture A with the grinder again for 1-2 hours, to obtain a fully-ground nonmetallic mineral, subjecting the fully-ground nonmetallic mineral to a heat treatment in a heating furnace for 1.5-2 hours, placing the fully-ground nonmetallic mineral after the heat treatment in a refrigerator for a refrigeration, and consolidating, to obtain a consolidated nonmetallic mineral, introducing the consolidated nonmetallic mineral into a high-speed vortex machine and pulverizing the consolidated nonmetallic mineral therein, and sieving the resulting nonmetallic mineral twice, to obtain a nonmetallic mineral powder.

In some embodiments, a speed ratio of the grinder in step 3.1, step 3.2 and step 3.3 provided by the present disclosure is 1:4:8.

In some embodiments, the refrigeration is performed at a temperature of −15° C. to −5° C.

Figure 3:
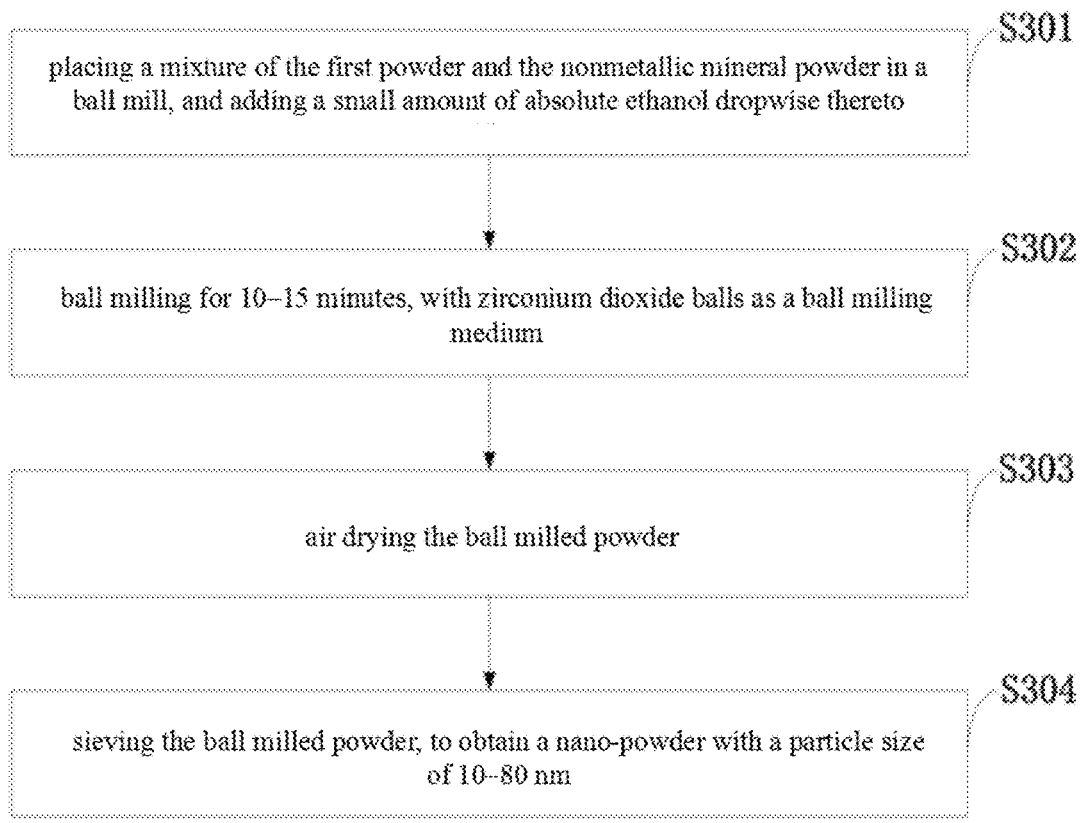
FIG. 3 shows a flowchart of a ball milling according to one embodiment of the present disclosure.
Figure 4:
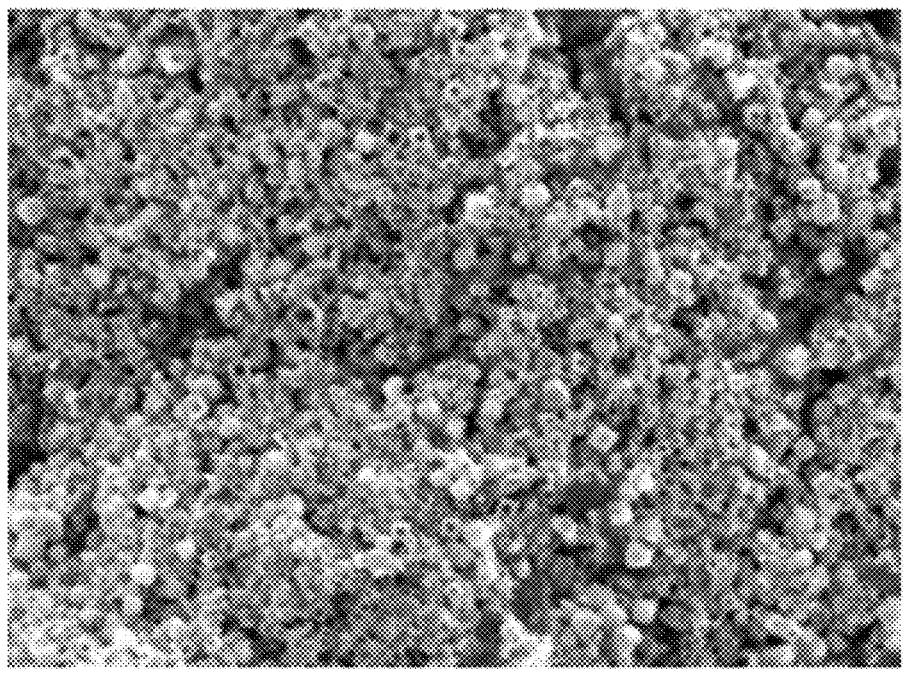
FIG. 4 shows a scanning electron microscope image of the dust-reducing and dust-absorbing material according to one embodiment of the present disclosure.
Figure 5:
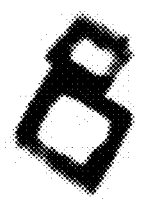
FIG. 5 shows a transmission electron microscope image of the dust-reducing and dust-absorbing material according to one embodiment of the present disclosure.
Figure 5:
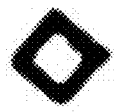
Figure 5:
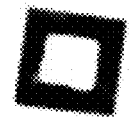

As shown in FIG. 3, ball milling the resulting mixture in some embodiments of the present disclosure specifically comprises steps:

S301, placing a mixture of the first powder and the nonmetallic mineral powder in a ball mill, and adding a small amount of absolute ethanol dropwise thereto;

S302, ball milling for 10-15 minutes to obtain a ball milled powder, with zirconium dioxide balls as a ball milling medium;

S303, air drying the ball milled powder; and

S304, sieving the dried ball milled powder, to obtain a nano-powder with a particle size of 10-80 nm.

The technical solutions of the present disclosure will be further described below in conjunction with specific examples.

Example 1

A limestone block with a moderate volume was chosen from a cement plant, about 10 cm×10 cm×20 cm in size, and calcined, obtaining quicklime.

The quicklime after the calcining was cooled at ambient temperature, dried and pulverized, obtaining a first powder essentially consisting of a quicklime powder and a calcium carbonate powder.

Granite was fully dried and ground, obtaining a granite powder.

The first powder and the granite powder were mixed, stirred to be uniform, obtaining a mixture, and the mixture was ball milled, obtaining a nano-powder, with a particle size of 10-80 nm.

A dust-absorbing material was added to the nano-powder, and water was added thereto, and they were mixed; the resulting mixture was poured into a mold, and stoved.

After being stoved, the resulting mixture was taken out and air dried, obtaining a cavernous dust-reducing and dust-absorbing material.

Example 2

The cavernous dust-reducing and dust-absorbing material as prepared in Example 1 was subjected to an adsorption test.

The porous structure is characterized as main parameters, such as porosity, average pore size, maximum pore size, pore size distribution, pore shape and specific surface area. In addition to the material itself, the mechanical properties and various use properties of the material are determined by its porous structure parameters. Since the pores are formed by stacking, compacting, and sintering powder particles, porous structure and even final performances are mainly determined by physical and chemical properties of the raw material powder, especially size, size distribution and shape of the powder particles.

In this example of the present disclosure, the adsorption test of the cavernous dust-reducing and dust-absorbing material included particle size, porosity, and average pore size. The results were as follows:

|  | Particle size | Porosity | Average pore size |
|---|---|---|---|
| Existing dust-reducing and dust-absorbing material | 2 nm to 1.5 mm | 160-400 nm | large |
| Cavernous dust-reducing and dust-absorbing material of the present disclosure | 10-80 nm | 2 nm to about 4 nm | very low |

The above are only the preferred specific embodiments of the present disclosure, but the scope of the present disclosure is not limited thereto. Anyone skilled in the art could make any modifications, equivalent replacements and improvements within the spirit and principle of the present disclosure, and such modifications, equivalent replacements and improvements shall fall within the scope of the present disclosure.

What is claimed is:

1. A method for producing a dust-reducing and dust-absorbing material from a nonmetallic mineral and a raw material from a cement plant, comprising, step 1, choosing from raw material from a cement plant a limestone block with a moderate volume, and calcining the limestone block, to obtain quicklime;
wherein calcining the limestone block comprises steps:
(1) placing the limestone block in a calcining kiln for calcining;

(2) after decomposing the limestone and swelling a lime grain, stopping heating, and thermally insulating for 1 hour;

(3) cooling the lime grain slowly, extracting carbon dioxide generated during the calcining of the limestone block, and transferring carbon dioxide to a container;

(4) under the condition that the pressure in the calcining kiln is less than 1.6 MPa, stopping extraction of carbon dioxide, and opening the calcining kiln for a ventilation, to obtain quicklime; and (5) stirring and cooling quicklime;

step 2: cooling quicklime at ambient temperature, drying and pulverizing quicklime, to obtain a first powder essentially consisting of a quicklime powder and a calcium carbonate powder;

wherein drying and pulverizing quicklime comprises a step:

placing the cooled quicklime into a drying equipment for drying, introducing the dried quicklime into a pulverizer to pulverize; and sieving with a fine sieve to obtain a fine powder and remove coarse particles;

step 3, fully drying and grinding a nonmetallic mineral, to obtain a nonmetallic mineral powder;

wherein grinding the nonmetallic mineral comprises steps:

3.1) adding an appropriate amount of a nonmetallic mineral after drying into a grinder, adding enough lubricating oil into a refueling bottle of the grinder via an oil inlet pipe to lubricate a grinding wheel of the grinder while rotating, starting the grinder and grinding the nonmetallic mineral, to obtain a preliminarily-ground nonmetallic mineral;

3.2) introducing the preliminarily-ground nonmetallic mineral into a stirring mill, rotating a stirring shaft of the stirring mill in one direction at a high speed for 10-20 minutes, causing violent collisions between the preliminarily-ground nonmetallic minerals, thereby further crushing the preliminarily-ground nonmetallic mineral, and rotating the stirring shaft of the stirring mill in the other direction at a high speed for 10-20 minutes, thereby yet further crushing the preliminarily-ground nonmetallic mineral, to obtain a mixture A; and 3.3) grinding the mixture A with the grinder again for 1-2 hours, to obtain a fully-ground nonmetallic mineral, subjecting the fully-ground nonmetallic mineral to a heat treatment in a heating furnace for 1.5-2 hours, placing the fully-ground nonmetallic mineral after the heat treatment in a refrigerator for a refrigeration, consolidating, to obtain a consolidated nonmetallic mineral, introducing the consolidated nonmetallic mineral into a high-speed vortex machine and pulverizing the consolidated nonmetallic mineral therein, and sieving the resulting nonmetallic mineral twice, to obtain a nonmetallic mineral powder;

step 4, mixing the first powder and the nonmetallic mineral powder, stirring to be uniform, to obtain a mixture, and ball milling the mixture, to obtain a nano-powder;

step 5, adding a dust-absorbing material to the nano-powder, adding water and mixing, pouring the resulting mixture into a mold, and stoving; and step 6, taking the resulting mixture out after stoving, and air drying the resulting mixture, to obtain a cavernous dust-reducing and dust-absorbing material.

2. The method for producing a dust-reducing and dust-absorbing material from a nonmetallic mineral and a raw material from a cement plant as claimed in claim 1, wherein in step (1), calcining the limestone block comprises calcining the limestone block at 1050° C. and ambient pressure.

3. The method for producing a dust-reducing and dust-absorbing material from a nonmetallic mineral and a raw material from a cement plant as claimed in claim 1, wherein the nonmetallic mineral is one or more selected from the group consisting of magmatic rock, sedimentary rock, metamorphic rock, granite, limestone, quartzite, diorite, basalt, quartz sandstone, siliceous conglomerate, granite gneiss, shale, mudstone, chlorite schist, mica schist, basalt, and quartz sandstone.

4. The method for producing a dust-reducing and dust-absorbing material from a nonmetallic mineral and a raw material from a cement plant as claimed in claim 1, wherein in step 3, fully drying the nonmetallic mineral comprises drying the nonmetallic mineral at 200° C. for 2 hours.

5. The method for producing a dust-reducing and dust-absorbing material from a nonmetallic mineral and a raw material from a cement plant as claimed in claim 1, wherein in step 3, a speed ratio of the grinder in step 3.1, step 3.2 and step 3.3 is 1:4:8.

6. The method for producing a dust-reducing and dust-absorbing material from a nonmetallic mineral and a raw material from a cement plant as claimed in claim 1, wherein in step 3.3), the refrigeration is performed at a temperature of −15° C. to −5° C.

7. The method for producing a dust-reducing and dust-absorbing material from a nonmetallic mineral and a raw material from a cement plant as claimed in claim 1, wherein in step 4, ball milling the mixture comprises steps:

1) placing a mixture of the first powder and the nonmetallic mineral powder in a ball mill, and adding a small amount of absolute ethanol dropwise thereto;

2) ball milling for 10-15 minutes to obtain a ball milled powder, with zirconium dioxide balls as a ball milling medium;

3) air drying the ball milled powder; and 4) sieving the dried ball milled powder, to obtain a nano-powder with a particle size of 10-80 nm.

8. The method for producing a dust-reducing and dust-absorbing material from a nonmetallic mineral and a raw material from a cement plant as claimed in claim 1, wherein the dust-absorbing material is a combination of two or more of silica gel, activated carbon, diatomaceous earth, activated alumina, and zeolite.

9. The method for producing a dust-reducing and dust-absorbing material from a nonmetallic mineral and a raw material from a cement plant as claimed in claim 1, wherein in step 5, stoving the mixture comprises stoving the mixture at 120° C. for 10 hours; turning the mixture over during the stoving.

10. A dust-reducing and dust-absorbing material, which is produced by the method for producing a dust-reducing and dust-absorbing material from a nonmetallic mineral and a raw material from a cement plant as claimed in claim 1.

* * * * *